(12) United States Patent
Hicks, III et al.

(10) Patent No.: US 8,060,557 B2
(45) Date of Patent: Nov. 15, 2011

(54) APPLICATION SERVICES GATEWAY

(75) Inventors: John A. Hicks, III, Roswell, GA (US);
Randy Zimler, Gainesville, GA (US);
Mustafa S. Bilsel, Atlanta, GA (US)

(73) Assignee: AT&T Intellectual Property I, LP,
Atlanta, GA (US)

( * ) Notice: Subject to any disclaimer, the term of this patent is extended or adjusted under 35 U.S.C. 154(b) by 0 days.

(21) Appl. No.: 11/788,168

(22) Filed: Apr. 19, 2007

(65) Prior Publication Data

US 2007/0192477 A1    Aug. 16, 2007

Related U.S. Application Data

(63) Continuation of application No. 10/317,419, filed on Dec. 11, 2002, now Pat. No. 7,209,945.

(60) Provisional application No. 60/410,017, filed on Sep. 11, 2002.

(51) Int. Cl.
*G06F 15/16* (2006.01)

(52) U.S. Cl. ........ 709/203; 709/218; 709/219; 709/224; 709/225; 379/201; 713/102

(58) Field of Classification Search .................. 709/203, 709/218, 219, 224, 225; 379/102; 713/201
See application file for complete search history.

(56) References Cited

U.S. PATENT DOCUMENTS

| | | | |
|---|---|---|---|
| 6,453,687 B2 | 9/2002 | Sharood et al. | 62/127 |
| 6,480,586 B1 * | 11/2002 | Hayes et al. | 379/102.02 |
| 6,496,575 B1 * | 12/2002 | Vasell et al. | 379/102.05 |
| 6,681,392 B1 * | 1/2004 | Henry et al. | 717/176 |
| 6,756,998 B1 * | 6/2004 | Bilger | 715/764 |
| 6,950,725 B2 | 9/2005 | Von Kannewurff et al. | 700/275 |
| 7,209,945 B2 | 4/2007 | Hicks, III et al. | |
| 2001/0025349 A1 | 9/2001 | Sharood et al. | 713/340 |
| 2002/0005894 A1 * | 1/2002 | Foodman et al. | 348/143 |
| 2002/0069262 A1 * | 6/2002 | Rigori et al. | 709/218 |
| 2002/0116477 A1 | 8/2002 | Somashekar et al. | 709/220 |
| 2003/0009559 A1 * | 1/2003 | Ikeda | 709/225 |
| 2003/0035430 A1 * | 2/2003 | Islam et al. | 370/401 |
| 2003/0149894 A1 * | 8/2003 | Bellinger et al. | 713/201 |
| 2006/0053459 A1 * | 3/2006 | Simerly et al. | 725/105 |

* cited by examiner

*Primary Examiner* — Tina Nguyen
(74) *Attorney, Agent, or Firm* — Parks IP Law LLC; Jennifer P. Medlin, Esq.

(57) ABSTRACT

Application services gateways that execute electronic application programs/services allows the application programs/services to be managed and administered out of a network rather than locally. The application services gateways are elements in a services delivery system that execute application programs/services that control or otherwise interact with systems and devices of a home or business such as a heating and cooling system or a security system. The application services gateways have a LAN connection to a communication gateway that in turn communicates over a WAN to a remote services gateway. The remote services gateway channels data from a remote service platform to provide application programs/services and management services over the WAN to the communications gateway where it is then channeled to the application services gateways. The installation and management of the application programs/services residing and/or being executed at the local site on the application services gateways relieves the consumer of such responsibilities.

20 Claims, 4 Drawing Sheets

APPLICATION SERVICES GATEWAY

RELATED APPLICATIONS

This application is a continuation of U.S. application Ser. No. 10/317,419, filed on Dec. 11, 2002, entitled "Application Services Gateway", now U.S. Pat. No. 7,209,945, which claims priority to U.S. Provisional Application Ser. No. 60/410,017 filed on Sep. 11, 2002 entitled "Application Services Gateway", which is incorporated herein by reference.

TECHNICAL FIELD

The present invention is related to providing electronic application programs/services to local sites and managing those applications. More particularly, the present invention relates to an element in a services delivery system that allows one or more application programs/services to be remotely provided to it for execution and to be remotely managed once provided.

BACKGROUND

Electronic application programs are used within a home or business for many reasons to assist people in their lives by establishing particular services. As such, the applications programs and the services they provide may be referred to collectively as application programs/services. For example, a personal computer may contain many application programs establishing services that allow an individual to interface with the computer to perform various tasks such as word processing, electronic mail, and scheduling. As more devices within a home or business are becoming electronic, the variety of application programs/services that work in conjunction with these devices is greatly expanding. Application programs/services now extend beyond those typically found on a personal computer that are focused on interaction with the user. For example, application programs/services now exist to provide customized control of security systems, heating and cooling systems, household appliances, and various other systems and devices.

Typically for personal computers, consumers are responsible for the management of the application programs/services such as installing, configuring, and executing the desired application programs/services. However, as the number and complexity of application programs/services affecting one's life increases in conjunction with the number of systems and devices that utilize application programs/services, consumers are less capable of the management responsibilities. Tasks such as acquiring, installing, configuring, monitoring, and/or updating application programs/services are undesirable or even impossible for the consumer since they may be complicated and time consuming. Therefore, consumers generally prefer to avoid these tasks and prefer that someone else be responsible for the management of application programs/services.

To manage application programs/services without the consumer being responsible typically requires that a technician perform the necessary tasks. The application programs/services for an individual may often be local such that the application program/service itself resides in electronic or magnetic memory and is executed at the location where the effects of the application program/service are to occur. For example, the application programs/services controlling or otherwise interacting with a heating and cooling system or a security system are typically located and executed at the residence where the heating and cooling system or security system is located. This avoids potential communication problems between the application program/service and the systems that might jeopardize their operation. However, a technician must visit the residence where the application program/service is to reside to manage the application program/service, including the initial installation of the program/service and subsequent updates of the program/service. This is an inconvenience to both the technician and the consumer, and may result in unsatisfactory management of the application programs/services.

Additionally, specialized and dedicated hardware is often required at the local site to run each of the application programs/services. Because the amount of resources provided by the hardware affects its cost, it may be desirable to keep the hardware costs low by utilizing hardware with limited resources to execute one or more of the application programs/services. Due to limited resources, the hardware may not be capable of simultaneously accommodating every possible application program/service and version that may be needed by a consumer. Thus, application programs/services may need to be repetitiously installed and removed or replaced with a newer version so that the hardware has access to an application program/service needed at any given time. This further aggravates the installation and management issues for application programs/services at the local site.

SUMMARY

Embodiments of the present invention address these issues and others by providing an application services gateway that executes application programs to provide services for the consumer. The application services gateway may receive application programs through a network connection from a network source. Additionally, the application services gateway may execute the application programs according to the instructions received through the network from the network source.

One embodiment is a method of providing application services to a consumer. The method involves providing an application services gateway connected to a communications gateway for the consumer, and the application services gateway provides execution of the application services. The application services of the application services gateway are administered from a network location in communication with the application services gateway through the communications gateway.

Another embodiment is an application services gateway that includes a services interface to an external system, a local area network interface, and a processing device. The processing device is configured to receive administration commands through the network interface and to execute application programs to bring about application services in accordance with the administration commands. The application services result in interaction with the external system through the services interface.

Another embodiment is an application services gateway system. The system includes storage containing an application program, a local area network interface, and a processing device. The processing device executes a real-time operating system, executes a virtual machine atop the operating system, executes a services framework atop the virtual framework, and executes the application program from storage atop the services framework. The execution of the services framework provides for reception of administration instructions through the local area network interface to control execution of the application program.

Another embodiment is a system for providing application services to a consumer. A network services gateway is connected to a network and has access to a store of application programs. A communications gateway is connected to the network remotely from the network services gateway. An application services gateway is connected to the communications gateway and receives application programs and instructions for controlling execution of the application programs from the network services gateway through the communications gateway.

DETAILED DESCRIPTION

Embodiments of the present invention provide application services gateways that execute application programs/services and that allow the application programs/services to be remotely installed and managed. The application services gateways are elements in a services delivery system where the services may be subscribed to in various ways. For example, a user can go to a website or contact a service representative to subscribe to a new service. In this example, when a user successfully subscribes to a new service, a dynamic link to the new service is automatically established on the user's family home page maintained on a network. If the new service requires that an application program/service be downloaded to an applications services gateway in the user's home from the network, the appropriate application program/service will be downloaded from the application program/service repository server in the network to the applications services gateway. After the application program/service has been successfully downloaded to the application services gateway, the user will gain access to the service via the dynamic link on the user's family home page. In general, the user interface to the individual services will be through a web browser interface. The application services gateway has connectivity to devices and systems that the application programs/services control or otherwise interact with, and the application services gateway also has connectivity to a local area network ("LAN") to wide area network ("WAN") gateway, such as a DSL or cable modem. Through the LAN to WAN gateway, remote installation and management of application programs/services for the application services gateway may occur.

Figure 1:
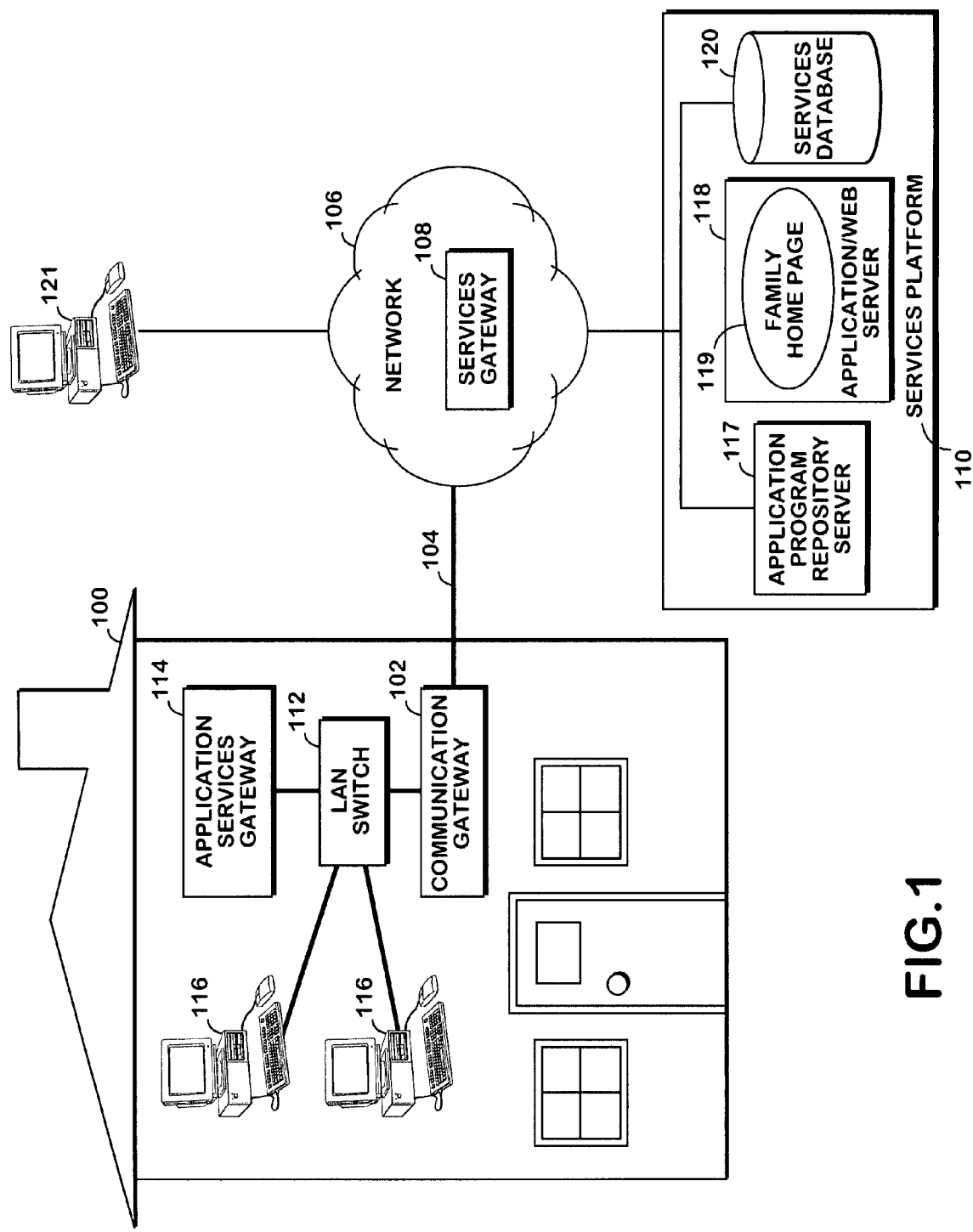
FIG. 1 illustrates a services delivery system that utilizes embodiments of the present invention to provide application programs/services to local sites and to provide remote management of the application programs/services.

As shown in FIG. 1, an environment for the application services gateway includes a home or business residence 100. The residence 100 includes a communication gateway 102 that provides LAN to WAN gateway services. The communication gateway 102 is connected to a WAN 106 of the outside world through data link 104. For example, the communication gateway 102 may include an integrated DSL modem connected to a plain old telephone system ("POTS") circuit providing DSL services and utilizing the TCP/IP protocol to transfer data. The communication gateway 102 provides bi-directional communication of data between the LAN of the residence 100 and the WAN 106.

The LAN of the residence 100 for the embodiment shown includes a LAN switch 112, such as an Ethernet router that may be separate from or integral with the communications gateway 102. The switch 112 distributes LAN traffic between the various devices of the LAN and the WAN 106. For example, the WAN 106 may include the Internet so that WAN traffic may be relevant to several devices of the LAN where one device has applications that are being remotely managed through the WAN 106 while another device is accessing other web sites.

Many devices may be linked to the communication gateway 102 through the LAN switch 112. The LAN switch 112 may be connected to a personal computer 116 to allow the computer 116 to access the WAN 106. One or more application services gateways 114 may be linked to the communication gateway 102 to receive the application program/service installations and management instructions sent from the WAN 106. It will be appreciated that the application services gateway 114 may be linked directly to the communications gateway 102 without requiring a LAN switch 112 where no other devices of the residence 100 require access to the WAN 106.

The application services gateways 114 act as execution environments to execute one or more of the application programs/services simultaneously for the residence 100. It will be appreciated that there could be more than one application services gateway installed on the home network in the residence. For example, one application services gateway 114 may be configured to provide one set of services with related functionality, such as multi-media entertainment, while another application services gateway 114 is configured to provide a different set of services with different functionality, such as home management and control. Thus, the cost of the application services gateway 114 may be controlled by providing the application services gateway 114 with only the functionality needed by a particular service or set of services, or alternatively, if cost is not an issue then an application services gateway 114 may be provided with many types of functionality needed by many services.

As an example of the varying degrees of functionality, a single application services gateway 114 may be communicatively linked to one system or device of the residence 100 to control or otherwise interact with the system or device as dictated by the application programs/services. For example, an application program/service may be executed by an application services gateway 114 having an interface (e.g., power line modem) to an HVAC system to control the heating and cooling system. Another application program/service may be executed by another application services gateway 114 in the residence 100 having an interface (e.g., 802.11b wireless) to security cameras to transfer security camera images over the WAN 106. Thus, if a consumer only needs some services, the application services gateway 114 capable of providing those specific services may be purchased at a lesser cost than an application services gateway 114 capable of providing many services. However, if cost does not need to be controlled as closely, then an application service gateway 114 with capabilities for many services may be provided such as having interfaces to both the HVAC system and the security cameras.

The application services gateway 114 is a managed network element as shown in FIG. 1. As such, the operation of the application services gateway 114 is controlled from the network 106 rather than locally at the application services gateway 114. The application programs/services implemented by the application services gateway 114 are managed and administered out of the network 106 by the service provider from a services platform 110 discussed below. As such, the application services gateway 114 operates as a plug and play box for the consumer requiring relatively simple connections such as to a power outlet and Ethernet connection to become operational. The application services gateway 114 may be of various forms, such as a stand-alone unit or a digital set top box.

The application services gateway 114 may be delivered to the consumer containing a bundle of application programs/services for the consumer that the application services gateway 114 is capable of providing as discussed above. However, during operation, the application services gateway 114 may receive updates, replacements, and new application programs/services from the network 106. Thus, the lifecycle of each application program/service residing on and/or being performed by the application services gateway 114 is managed out of the network 106.

The application services gateway 114 may implement a customized or commercially available services framework to allow execution, remote installation, and lifecycle management of application programs/services. For example, the Open Systems Gateway Initiative ("OSGi™") framework or JINI™ framework of Sun Microsystems may be utilized by the application services gateway 114 to receive and install the remotely provided application programs/services from the application program/service repository server 117 in the network 106. Also, the application services gateway 114 executes a customized virtual machine or a commercially available virtual machine such as the JAVA™ Virtual Machine on the operating system where the services framework, such as OSGi™ or JINI™, operates through the virtual machine rather than through direct execution from an operating system. Alternatively, the application services gateway 114 may execute a services framework directly through an operating system. The services framework in conjunction with a real-time operating system allows the application program/service installations and life cycle management to occur without service interruption at the application services gateway 114. Additional details and alternatives for the application services gateway and related program modules are discussed below with reference to FIGS. 2-4.

As discussed above, the WAN 106 may be a publicly accessible network such as the Internet or may be a private WAN. Through the WAN 106, a remote services gateway 108 has access to the data link 104 to the communications gateway 102. The remote services gateway 108 channels data between a services platform 110 and the application services gateway 114 of the residence 100. As one example, the services platform 110 consists of an application/web server 118, an application program/service repository server 117, a services database 120 and a family home page 119 website. The services platform 110 provides information including application program/service data, application update data, application configuration data, and related instructions to the application services gateway 114 where the application programs/services can be installed, configured, updated as necessary, and executed when needed.

The services platform 110 may also operate upon custom or commercially available frameworks matching those of the application services gateway 114. For example, the OSGi™ framework may be utilized by the services platform 110 to provide the remote installation and management of application programs/services for application services gateways 114 also employing the complementary OSGi™ framework. Also, the application programs/services provided from the services platform 110 may be developed to operate upon a virtual machine that is employed by the application services gateway 114. Alternatively, the application programs/services may be developed to execute directly from the operating system of the application services gateway 114.

The application programs/services, update data, and configuration data made available by the services platform 110 may be provided from various vendors. Therefore, it may be difficult to control standardization for new developments intended to be provided from the services platform 110 to the application services gateway 114. Furthermore, the operating systems may vary from one application services gateway 114 to the next. A standard virtual machine as discussed above may be utilized so that the service framework is not operating system dependent. Furthermore, a standard service framework ensures that application programs/services designed by various vendors are more likely to be compatible with the application services gateway 114 and existing application programs/services.

As new developments are made available, the services platform 110 determines whether the application services gateway 114 should receive a new application, an update, a new configuration for an application, or whether other management activity should occur based on information known about the application services gateway 114. For example, the services platform 110 may maintain a database of the information that has been communicated to the application services gateway 114, or alternatively, the services platform 110 may query the application services gateway 114 for this information for embodiments of the application services gateway 114 that stores this status information for reporting to the services platform 110 upon request.

Additionally, the application/web server 118 discussed above provides the family home page 119 to the user through the network 106. The user can log onto the family home page 119 through a home computer 116 linked to the network 106 and choose from a variety of service offerings available for the consumer as specified in the services database 120. The user can also log onto the family home page 119 through computer 121 that is connected to the network 106 other than through the LAN of residence 100. Other possibilities for subscribing to a service are possible as well, such as placing an order with a service representative over a telephone call. Upon selecting a service, the services database 120 is updated to indicate that this particular consumer has subscribed to a particular service, and a link to the service is provided on the family home page 119 to allow the consumer to access the service if necessary, such as to terminate the service. Thus, the administrative interface to the application services gateway 114 is through a network based interface, such as a web browser interface. Then, the application repository server 117 transfers the application program/service to the service framework of the application services gateway 114 for installation and execution to bring about the requested service. Additionally, if a service is chosen that the existing application services gateway 114 in the residence 100 does not support due to lack of functionality, then an additional services gateway 114 is provided in the residence 100 to perform the chosen application program/service.

Figure 2:
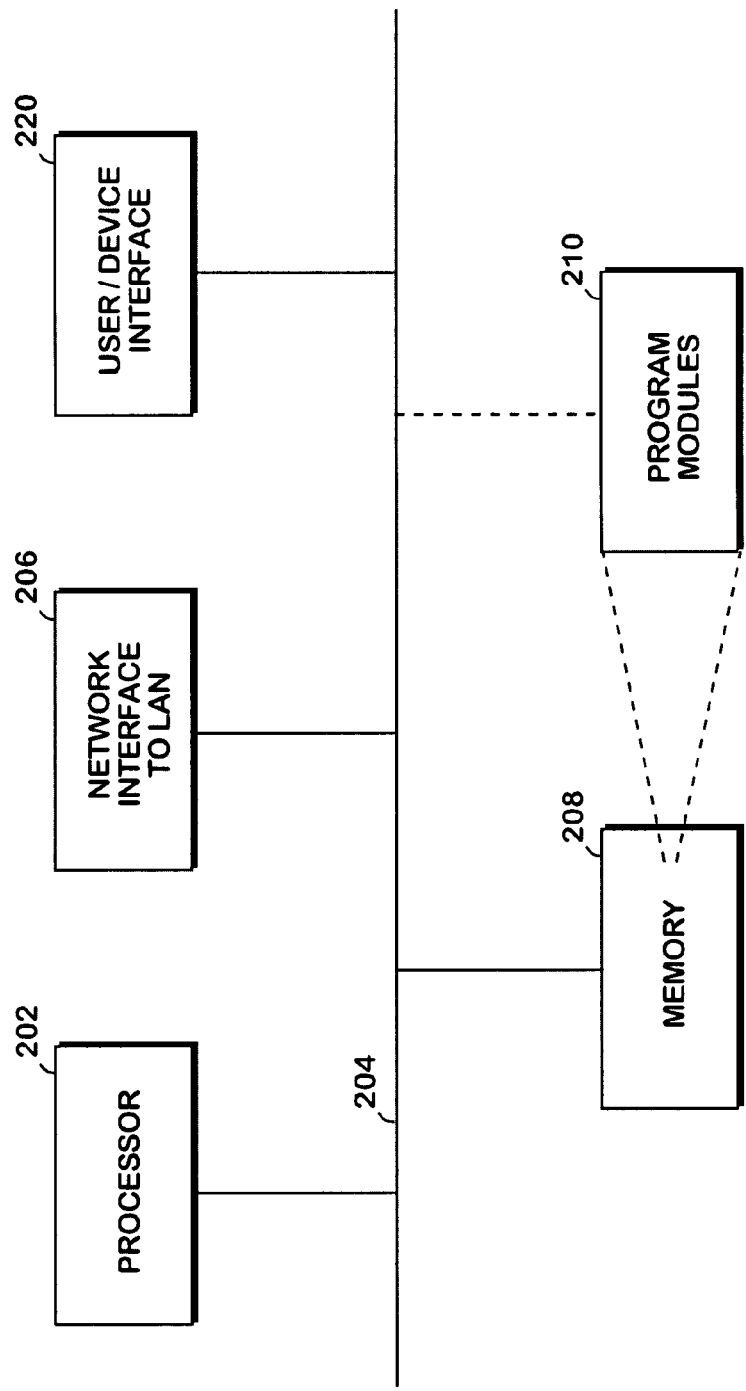
FIG. 2 illustrates the basic components of an application services gateway according to one embodiment of the present invention.

FIG. 2 shows the major components of an application services gateway 114. A processor 202 is included to execute logical operations that result in the performance of various tasks. Such tasks include implementing commands received from the services platform 110 to install and manage application programs/services. The processor 202 may be of various forms such as a general-purpose programmable processor or hardwired digital logic. The processor 202 communicates with other components of the application services gateway 114 through a bus 204.

The processor 202 accesses memory 208 through the bus 204. The memory 208 may include random access memory, read-only memory, and any combination of the two. Programming for the processor 202 may be stored in the memory 208 where the processor is programmable. For example, a basic input and output system may be stored in memory 208 to control the processor 202 upon boot-up of the application services gateway 114. During the execution of processes, the processor 202 stores and retrieves relevant data from memory 208.

Additionally, a set 210 of program modules may be maintained in memory 208 to be executed by the processor 202. Alternatively, the set 210 of program modules may be maintained in a storage device such as a hard disk drive that communicates with the processor 202 through a controller linked to the bus 204 or linked to an external interface of the application services gateway 114 such as a serial port or the network interface 206 such that the storage device may be integral to the application services gateway 114, may be external to the application services gateway 114, or may be remotely located from the application services gateway 114.

Figure 4:
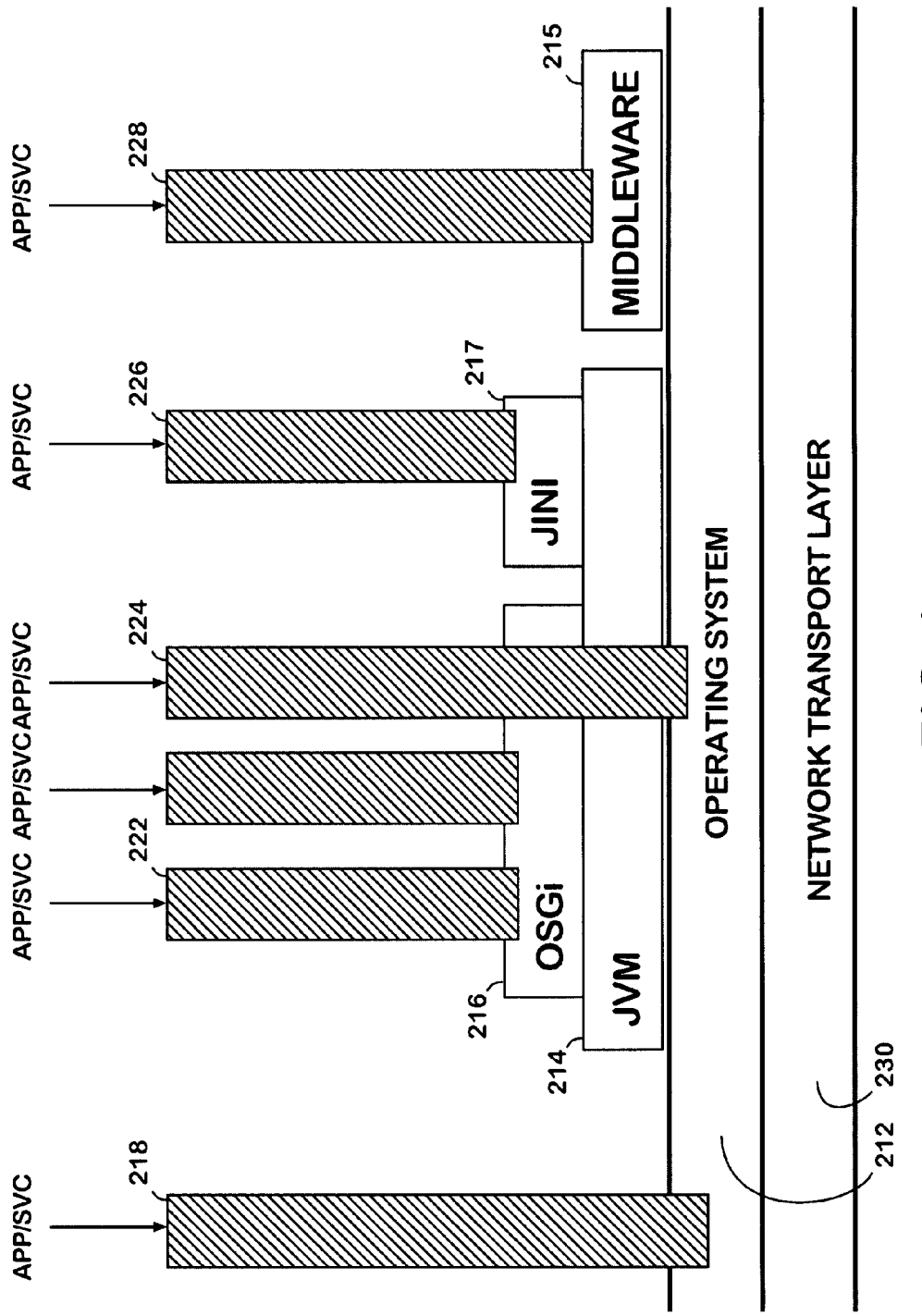
FIG. 4 illustrates variations of program module stacks according to various embodiments of the present invention.

The set 210 of program modules are implemented by the processor 202 to provide the services of the various application programs. The particular stack orientation of the set 210 of program modules may vary. Examples of the stack orientation for the set 210 are shown in FIG. 4. The program modules include an operating system 212 residing above and interacting with a network transport layer 230 to handle the network communications. The operating system 212 may be a commercially available version or a simplified operating system for specifically performing the basic functions necessary for implementation of the remaining program modules. In one or more embodiments, the operating system 212 is a real-time operating system such as QNX to provide increased reliability and speed where high value services such as security camera monitoring are provided by the application services gateway 114. Additionally, the real-time operating system 212 allows application programs/services to be installed, configured, updated, and/or deleted without rebooting of the application services gateway 114 so that other application programs/services continue to function normally.

The set 210 of program modules may include the virtual machine 214 such as the JAVA™ virtual machine ("JVM"), discussed above, for embodiments where the application programs/services are designed to execute on the virtual machine 214 rather than directly on the operating system. As discussed, using a virtual machine 214 allows the service framework to be developed without regard for the particular operating system 212 that an application services gateway 114 may be employing.

The set 210 of program modules may also include a service framework module discussed above, such as the OSGi™ framework 216 or the JINI™ framework 217 that operates upon the virtual machine 214 and that implements the logical operations necessary to communicate with the remote services platform 110 as to facilitate the network based lifecycle management of the application programs/services. The service framework module 216 or 217 may be included to facilitate the remote installation and management of the application programs/services due to the application programs/services being executed upon the service framework, rather than directly on the virtual machine 214 or operating system 212. The logical operations of the service framework module 216 or 217 are discussed in more detail below with reference to FIG. 3. These logical operations may be brought about through implementation in accordance with the OSGi™ or other similar service framework such as JINI™.

The OSGi™ service framework specification delineates Application Programming Interface ("API") standards that address service life cycle management, inter-service dependencies, data management, device management, client access, resource management and security. Using these APIs, the service platform 110 can automatically download network-based services while the application services gateway 114 manages the installation, versioning and configuration of these services accordingly.

The application programs/services may be configured to be executed in a variety of ways for various embodiments of the application services gateway 114. For example, the application program/service 218 provided from the services platform 110 may be configured to execute directly atop the operating system 212, such as where the application program/service 218 includes logic to either control its own lifecycle or logic to receive lifecycle control from the services platform 110, as specified in FIG. 3.

Figure 3:
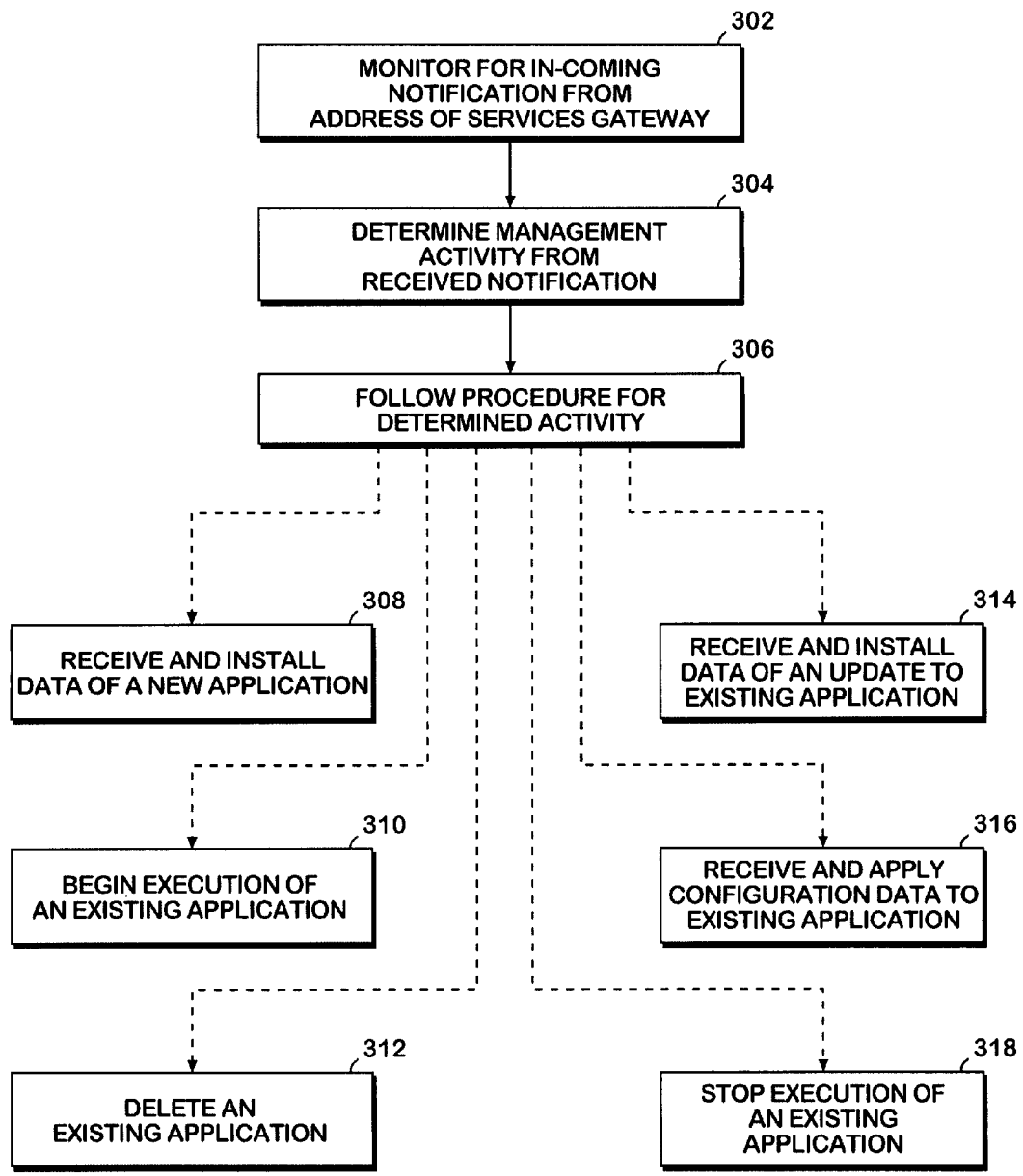
FIG. 3 illustrates the operational flow of service framework operations performed by the application services gateway according to one embodiment of the present invention.

Another example of an application program/service is application program/service 222 which is configured to operate atop the OSGi™ framework 216 wherein the OSGi™ framework 216 communicates with the services platform 110 to provide the lifecycle management, as specified in FIG. 3. As another similar example, application program/service 226 is configured to operate atop the JINI™ framework 217 wherein the JINI™ framework 217 communicates with the services platform 110 to provide the lifecycle management. Another example may involve an application program/service 224 that operates in conjunction with the OSGi™ framework 216 atop the JVM 214 but also has some interaction directly with the JVM 214 and/or operating system 212.

In addition to application programs/services operating atop the operating system 212 or on a service framework atop a virtual machine 214, other configurations may be used where middleware 215 operates atop the operating system 212 to provide a platform for application programs/services 228. In this example, the middleware 215 and/or the application program/service 228 is configured with logic to provide lifecycle management or to receive lifecycle management commands from the services platform 110 as shown in FIG. 3.

The application services gateway 114 also includes a network interface component 206 that is linked to the bus 204 to allow the processor 202 to send and receive data over the LAN of the residence 100. The network interface component 206 may be of various forms, such as an Ethernet interface, an 802.11B interface, a home phone networking alliance ("HPNA") interface, or other local area network interface that allows the application services gateway 114 to communicate with the communications gateway 102. Additionally, the network interface component 206 may act as a device interface to allow the application services gateway 114 to communicate with devices within the residential LAN that are controlled by or otherwise interact with the application programs/services 218 of the application services gateway 114. The application services gateway 114 establishes communication with the remote services platform 110 of the WAN 106 through the communication link between the network interface 206 and the communications gateway 102.

The application services gateway 114 may also include one or more external interfaces 220 connected to the bus 204. Examples of the external interfaces 220 include user interfaces and device interfaces. A user interface provides interaction with an application program/service. For example, one or more application programs/services 218 of the application services gateway 114 may involve end user interaction, such as a date book or to-do list, and these application programs/services may provide output to the user and receive input from the user through the user interface. The user interface may be of various forms, such as the combination of a conventional display device and keyboard, keypad, or mouse, or alternatively may be a touch screen.

Device interfaces establish the interaction between the application services gateway 114 and the devices of systems that are being acted upon by the application programs/services. As discussed above, the application services gateway 114 may interface with an HVAC system requiring a particular interface such as a power line modem. Alternatively or additionally, the application services gateway 114 may interface with security cameras requiring the same or a different interface such as an 802.11b wireless interface. As another example, the device interface may be an external bus connection to one or more add-on devices, such as a universal serial bus connection to an add-on power line modem and/or 802.11b wireless access point.

FIG. 3 shows the logical operations of the service framework module 216 or 217 or other program module discussed above that is executed by the application services gateway 114 to allow network-based lifecycle management. The logical operations begin by monitoring for an in-coming notification from the network address of the remote services platform 110 at monitor operation 302. The application services gateway 114 is responsive to the in-coming messages of the service platform 110 to allow the remote installation and management of the application programs/services 218.

Once the in-coming notification has been received, the application services gateway 114 determines the requested management activity from the received notification at determination operation 304. To effectuate the remote installation and management of application programs/services, the application services gateway 114 is configured to perform various tasks in response to the instructions from the services platform 110. After determining the particular activity to perform, the application services gateway then follows the procedure for the activity at procedure operation 306. The management activity and associated procedure may be stored at the application services gateway 114 so that the procedure to follow is accessed by a look-up of the requested activity. Alternatively, the services platform 110 may transmit the procedural steps to be performed to the application services gateway 114.

Many different management activities are possible. For example, the management activity and associated procedure may involve installation operation 308. At this operation, the application services gateway 114 receives application program/service data being downloaded to the application services gateway 114 from the services platform 110, such as in response to the consumer subscribing to a new service. The application services gateway 114 then stores the new application program/service so that the program/service can be executed by the virtual machine 216 or 217, middleware 215, or directly from the operating system 212 depending upon the application/service and configuration of the application services gateway 114.

Another example of a management activity and associated procedure is the execution operation 310. At this operation, the application services gateway 114 begins execution of a particular application program/service stored or otherwise directly accessible by the application services gateway 114. In certain embodiments, the execution operation 310 may be an automatic response to the installation operation 308.

Delete operation 312 provides another example of a management activity and an associated procedure. At delete operation 312, the application services gateway 114 deletes an application program/service from storage. Deleting an application may be necessary to maintain adequate storage resources for the application services gateway 114 or because a new version of the application program/service to be deleted is available. In certain embodiments, the delete operation 312 may be an automatic response to the stop operation 318 discussed below.

Installation operation 314 provides another example of a management activity and procedure. At this operation 314, the application services gateway 114 receives update data being downloaded form the services platform for an application that is already stored. For example, a particular file of the application program/service may be revised, updated, or added to provide new functionality or increased reliability for the application program/service. The update data is then stored along with the existing application program/service so that the update may be employed during execution.

Configuration operation 316 provides an additional management activity and procedure. At configuration operation 316, the application services gateway 114 receives configuration data being downloaded from the services platform 110 for an application program/service that is already stored. The configuration data controls how the application program/service operates, such as for example the particular options that an application program/service provides may be set by the configuration data for execution.

Another example of a management activity and procedure is the stop operation 318. At stop operation 318, the application services gateway 114 terminates operation of an application program/service that is currently being executed. This operation may result from a user request, or from the services platform 110 recognizing that the application program/service is no longer needed or will be replaced by a newer version.

During the performance of the logical operations of FIG. 3, the application services gateway 114 continues to execute application programs/services. Therefore, the remote installation and management operations do not interfere with the application programs/services operability. Thus, high value services provided through application programs/services such as those that control or monitor security systems are not interrupted while the application services gateway 114 performs the management activities requested by the services platform 110.

While the invention has been particularly shown and described with reference to illustrative embodiments thereof, it will be understood by those skilled in the art that various other changes in the form and details may be made therein without departing from the spirit and scope of the invention.

What is claimed is:

1. A method of providing application services to a consumer, comprising:

providing an application services gateway local to a location of a consumer device to be connected to a communications gateway for the consumer, the application services gateway providing execution of the application services selected by the consumer, wherein capabilities provided to the application services gateway and cost of the application services gateway vary depending on the application services selected by the consumer; and administering the application services of the application services gateway from a network location in communication with the application services gateway through the communications gateway, wherein administering the application services comprises:

configuring the application services gateway to implement a lifecycle management of the application services;

classifying at least one first application service as a high value service, wherein high value services are administered with increased reliability and speed; and administering at least one second application service without requiring rebooting of the application services gateway and without disrupting the execution of the at least one first application classified as a high value service.

2. The method of claim 1, wherein the application services gateway communicates with an external system of the consumer when executing the application services.

3. The method of claim 1, further comprising configuring the application services gateway to implement a services framework to allow execution, remote installation, and lifecycle management of the application.

4. The method of claim 1, further comprising: providing a home page in the network that allows the consumer to select the applications service to execute through the application services gateway; and upon receiving a selection from the consumer at the home page for an application service, sending an instruction to the application services gateway from the network location.

5. An application services gateway, comprising:
a services interface to an external system;
a local area network interface; and
a processing device local to a location of a consumer device and configured to:
  receive administration commands through the network interface;
  execute application programs to bring about application services selected by the consumer in accordance with the administration commands, wherein capabilities of the application services gateway and cost of the application services gateway vary depending on the application services selected by the consumer; and
  administer the application services of the application services gateway from the verified network location in communication with the application services gateway through a communication gateway, wherein administering the application services comprises a services framework operative to:
    configure the application services gateway to implement a lifecycle management of the application services;
    classify at least one of the application services as a high value service, wherein high value services are administered with increased reliability and speed;
    manage the execution, versioning, and configuration of the application services without requiring rebooting of the application services gateway and without disrupting the execution of at least one of the application services classified as high value; and
    allow the network locating to manage the installation of the application services.

6. The application services gateway of claim 5, further comprising storage for maintaining the application programs that is accessible by the processing device.

7. The application services gateway of claim 5, wherein the processing device is configured to receive administration commands and execute application programs in accordance with the administration commands by implementing a service framework that operates upon the administration commands to control the execution of the application programs.

8. The application services gateway of claim 7, wherein the service framework that operates upon the administration commands is executed through an operating system of the application services gateway.

9. The application services gateway of claim 5, wherein the services gateway is a powerline modem.

10. The application services gateway of claim 5, wherein the processing device implements a real-time operating system to execute the application programs.

11. An application services gateway system, comprising:
storage containing an application program;
a local area network interface; and
a processing device configured to:
  execute a real-time operating system;
  execute a virtual machine atop the operating system;
  execute a services framework atop the virtual framework;
  administer application services selected by a consumer, wherein administering the application services comprises:
    configure the application services gateway to implement a lifecycle management of the application services;
    classifying at least one of the application services as a high value service, wherein high value services are administered with increased reliability and speed;
    managing at least one of executing, versioning, and configuration of the application services without requiring rebooting of the application services gateway and without disrupting the execution of at least one of the application services classified as high value;
    sending a start execution instruction to the application services gateway when execution of at least one of the application services should begin;
    sending a stop execution instruction to the application services gateway when execution of the at least one of the application services should stop; and
    executing the application program from storage atop the services framework, wherein the execution of the services framework provides for reception of administration instructions through the local area network interface to control execution of the application program,
wherein capabilities of the application services gateway system and cost of the application services gateway system vary depending on the application services selected by the consumer.

12. The application services gateway system of claim 11, wherein the storage is remotely located from the local area network and the processing device.

13. The application services gateway of claim 11, wherein the local area network is Ethernet.

14. The application services gateway system of claim 11, further comprising an interface to an external system and wherein execution of the application program results in interaction through the interface to the external system.

15. A system for providing application services to a consumer, comprising:
a network services gateway remote from a location of a consumer device connected to a network and having access to a store of application programs;
a communications gateway connected to the network remotely from the network services gateway; and
an application services gateway local to the location of the consumer device and connected to the communications gateway comprising:
  means for receiving application programs and instructions for controlling execution of the application programs form the network services gateway through the communications gateway; and means for administering the application services selected by the consumer, wherein the means for administering the application services comprises:

means for configuring the application services gateway to implement a lifecycle management of the application services;

means for classifying at least one first application service as a high value service, wherein high value services are administered with increased reliability and speed;

means for managing at least one of execution, versioning, and configuration of the application services without requiring rebooting of the application services gateway and without disrupting the execution of that at least one of the application service classified as high value;

means for sending a start execution instruction to the application services gateway when execution of the at least one of the application services should begin; and means for sending a stop execution instruction to the application services gateway when execution of the at least one of the application services should stop, wherein capabilities of the application services gateway and cost of the application services gateway vary depending on the application services selected by the consumer.

16. The system of claim 15, wherein the network services gateway provides a home page for the consumer and wherein the homepage includes selections for the application programs that the network services gateway can access such that upon the consumer selecting an application program at eh homepage, the network services gateway sends the application program to the application services gateway and sends an instruction to the application services gateway to execution of the application program.

17. The system of claim 15, wherein the communications gateway comprises a modem and a router.

18. The system of claim 15, wherein the high value service includes security camera monitoring.

19. The system of claim 15, wherein the application services gateway is connected to the communications gateway through a local area network.

20. The system of claim 15, wherein the application services gateway is also connected to an external system and interacts with the external system upon executing one of the application programs.

* * * * *